United States Patent
Pieron

(10) Patent No.: US 11,654,364 B2
(45) Date of Patent: *May 23, 2023

(54) SYSTEM AND METHOD FOR PROVIDING DYNAMIC AND STATIC CONTEST PRIZE ALLOCATION BASED ON IN-GAME ACHIEVEMENT OF A USER

(71) Applicant: Kabam, Inc., San Francisco, CA (US)

(72) Inventor: Luc Pieron, San Francisco, CA (US)

(73) Assignee: Kabam, Inc., San Francisco, CA (US)

( * ) Notice: Subject to any disclaimer, the term of this patent is extended or adjusted under 35 U.S.C. 154(b) by 121 days.

This patent is subject to a terminal disclaimer.

(21) Appl. No.: 17/173,199

(22) Filed: Feb. 10, 2021

(65) Prior Publication Data

US 2021/0162309 A1    Jun. 3, 2021

Related U.S. Application Data

(63) Continuation of application No. 16/504,083, filed on Jul. 5, 2019, now Pat. No. 10,933,330, which is a
(Continued)

(51) Int. Cl.
*A63F 13/67*     (2014.01)
*G07F 17/32*     (2006.01)
(Continued)

(52) U.S. Cl.
CPC .............. *A63F 13/67* (2014.09); *A63F 13/00* (2013.01); *A63F 13/30* (2014.09); *A63F 13/35* (2014.09);
(Continued)

(58) Field of Classification Search
None
See application file for complete search history.

(56) References Cited

U.S. PATENT DOCUMENTS 5,816,918 A    10/1998    Kelly
5,933,813 A    8/1999    Teicher
(Continued)

FOREIGN PATENT DOCUMENTS

KR    1020130137431    12/2013
WO    2002026333    1/2002
(Continued)

OTHER PUBLICATIONS

'Quest item—WoWWiki—Your guide to the World of Warcraft', printed from http://www.wowwiki.com/Quest_Item, Retrieved on Apr. 16, 2014, 1 page.
(Continued)

*Primary Examiner* — Ronald Laneau
(74) *Attorney, Agent, or Firm* — Esplin & Associates, PC

(57) ABSTRACT

One aspect of the disclosure relates to providing dynamic and static contest prize allocation based on in-game achievement of a user in an online game in order to encourage players to continue to purchase items to improve their tournament metrics even if they may be unable to improve their tournament rank. For example, calculation of a dynamic prize may comprise for rank x, the player may gain 1 prize unit for every y Glory gained (when Glory may be the measured by the tournament). The y value may increase for lower ranks achieved in the tournament.

20 Claims, 5 Drawing Sheets

Related U.S. Application Data continuation of application No. 16/023,865, filed on Jun. 29, 2018, now Pat. No. 10,357,719, which is a continuation of application No. 15/613,025, filed on Jun. 2, 2017, now Pat. No. 10,010,796, which is a continuation of application No. 15/248,744, filed on Aug. 26, 2016, now Pat. No. 9,669,313, which is a continuation of application No. 14/626,899, filed on Feb. 19, 2015, now Pat. No. 9,468,851, which is a continuation of application No. 13/895,832, filed on May 16, 2013, now Pat. No. 8,961,319.

(51) Int. Cl.

| | | |
|---|---|---|
| A63F 13/00 | (2014.01) | |
| A63F 13/35 | (2014.01) | |
| A63F 13/798 | (2014.01) | |
| A63F 13/30 | (2014.01) | |
| A63F 13/46 | (2014.01) | |
| A63F 13/792 | (2014.01) | |
| A63F 13/795 | (2014.01) | |
| G06Q 30/02 | (2023.01) | |
| H04L 67/131 | (2022.01) | |

(52) U.S. Cl.
CPC ............ *A63F 13/46* (2014.09); *A63F 13/792* (2014.09); *A63F 13/795* (2014.09); *A63F 13/798* (2014.09); *G07F 17/3241* (2013.01); *G07F 17/3251* (2013.01); *G07F 17/3281* (2013.01); *G06Q 30/02* (2013.01); *H04L 67/131* (2022.05)

(56) References Cited

U.S. PATENT DOCUMENTS

| | | | |
|---|---|---|---|
| 5,964,660 | A | 10/1999 | James |
| 6,142,472 | A | 11/2000 | Kliebisch |
| 6,190,225 | B1 | 2/2001 | Coleman |
| 6,402,619 | B1 | 6/2002 | Sato |
| 6,561,904 | B2 | 5/2003 | Locke |
| 6,604,008 | B2 | 8/2003 | Chudley |
| 6,745,236 | B1 | 6/2004 | Hawkins |
| 6,811,483 | B1 | 11/2004 | Webb |
| 6,850,900 | B1 | 2/2005 | Hare |
| 6,928,474 | B2 | 8/2005 | Venkatesan |
| 7,050,868 | B1 | 5/2006 | Graepel |
| 7,076,453 | B2 | 7/2006 | Jammes |
| 7,156,733 | B2 | 1/2007 | Chiang |
| 7,192,352 | B2 | 3/2007 | Walker |
| 7,197,352 | B2 | 3/2007 | Gott |
| 7,326,115 | B2 | 2/2008 | Baerlocher |
| 7,381,133 | B2 | 6/2008 | Thomas |
| 7,533,336 | B2 | 5/2009 | Jaffe |
| 7,660,740 | B2 | 2/2010 | Boone |
| 7,682,239 | B2 | 3/2010 | Friedman |
| 7,698,229 | B2 | 4/2010 | Hsu |
| 7,785,188 | B2 | 8/2010 | Cannon |
| 7,813,821 | B1 | 10/2010 | Howell |
| 7,819,749 | B1 | 10/2010 | Fish |
| 7,945,802 | B2 | 5/2011 | Hamilton, II |
| 7,959,507 | B2 | 6/2011 | Cannon |
| 8,010,404 | B1 | 8/2011 | Wu |
| 8,016,668 | B2 | 9/2011 | Hardy |
| 8,047,909 | B2 | 11/2011 | Walker |
| 8,057,294 | B2 | 11/2011 | Pacey |
| 8,066,571 | B2 | 11/2011 | Koster |
| 8,105,156 | B2 | 1/2012 | Walker |
| 8,147,340 | B2 | 4/2012 | Brunetdecourssou |
| 8,157,635 | B2 | 4/2012 | Hardy |
| 8,187,101 | B2 | 5/2012 | Herrmann |
| 8,226,472 | B2 | 7/2012 | Van Luchene |
| 8,231,453 | B2 | 7/2012 | Wolf |
| 8,231,470 | B2 | 7/2012 | Feeney |
| 8,239,487 | B1 | 8/2012 | Hoffman |
| 8,246,439 | B2 | 8/2012 | Kelly |
| 8,272,934 | B2 | 9/2012 | Olive |
| 8,272,951 | B2 | 9/2012 | Ganz |
| 8,272,956 | B2 | 9/2012 | Kelly |
| 8,282,491 | B2 | 10/2012 | Auterio |
| 8,287,367 | B2 | 10/2012 | Hall |
| 8,287,383 | B1 | 10/2012 | Etter |
| 8,287,384 | B2 | 10/2012 | Auterio |
| 8,292,743 | B1 | 10/2012 | Etter |
| 8,313,372 | B2 | 11/2012 | Naicker |
| 8,317,584 | B2 | 11/2012 | Aoki |
| 8,317,601 | B1 | 11/2012 | Luciano, Jr. |
| 8,323,110 | B2 | 12/2012 | Shibamiya |
| 8,328,642 | B2 | 12/2012 | Mosites |
| 8,332,260 | B1 | 12/2012 | Mysen |
| 8,332,544 | B1 | 12/2012 | Ralls |
| 8,348,716 | B2 | 1/2013 | Ganz |
| 8,348,762 | B2 | 1/2013 | Willis |
| 8,348,767 | B2 | 1/2013 | Mahajan |
| 8,348,768 | B2 | 1/2013 | Auterio |
| 8,360,858 | B2 | 1/2013 | Larocca |
| 8,360,866 | B2 | 1/2013 | VanLuchene |
| 8,360,867 | B2 | 1/2013 | VanLuchene |
| 8,360,868 | B2 | 1/2013 | Shvili |
| 8,366,544 | B2 | 2/2013 | Walker |
| 8,366,550 | B2 | 2/2013 | Herrmann |
| 8,371,925 | B2 | 2/2013 | Bonney |
| 8,376,826 | B2 | 2/2013 | Katz |
| 8,382,572 | B2 | 2/2013 | Hoffman |
| 8,388,427 | B2 | 3/2013 | Yariv |
| 8,401,913 | B2 | 3/2013 | Alivandi |
| 8,408,989 | B2 | 4/2013 | Bennett |
| 8,439,759 | B1 | 5/2013 | Mello |
| 8,475,262 | B2 | 7/2013 | Wolf |
| 8,506,394 | B2 | 8/2013 | Kelly |
| 8,512,150 | B2 | 8/2013 | Herrmann |
| 8,533,076 | B2 | 9/2013 | Chu |
| 8,583,266 | B2 | 11/2013 | Herbrich |
| 8,636,591 | B1 | 1/2014 | Hawk |
| 8,758,119 | B1 | 6/2014 | BronsteinBendayan |
| 8,777,754 | B1 | 7/2014 | Santini |
| 8,784,214 | B2 | 7/2014 | Parks |
| 8,790,185 | B1 | 7/2014 | Caldarone |
| 8,821,260 | B1 | 9/2014 | Desanti |
| 8,831,758 | B1 | 9/2014 | Chu |
| 8,843,557 | B2 | 9/2014 | Ranade |
| 8,851,978 | B1 | 10/2014 | Koh |
| 8,920,243 | B1 | 12/2014 | Curtis |
| 8,961,319 | B1 * | 2/2015 | Pieron .................. A63F 13/795 |
| | | | 463/13 |
| 8,968,067 | B1 | 3/2015 | Curtis |
| 9,007,189 | B1 | 4/2015 | Curtis |
| 9,138,639 | B1 | 9/2015 | Ernst |
| 9,256,887 | B2 | 2/2016 | Santini |
| 9,257,007 | B2 | 2/2016 | Santini |
| 9,259,642 | B1 | 2/2016 | Mcneill |
| 9,286,510 | B2 | 3/2016 | Soohoo |
| 9,317,993 | B2 | 4/2016 | Hardy |
| 9,375,636 | B1 | 6/2016 | Wakeford |
| 9,403,093 | B2 | 8/2016 | Harrington |
| 9,406,201 | B2 | 8/2016 | Englman |
| 9,452,356 | B1 | 9/2016 | Tsao |
| 9,452,364 | B1 | 9/2016 | Curtis |
| 9,463,376 | B1 | 10/2016 | Kim |
| 9,468,851 | B1 * | 10/2016 | Pieron .................. A63F 13/792 |
| 9,610,503 | B2 | 4/2017 | Pieron |
| 9,616,331 | B1 | 4/2017 | Jordan |
| 9,626,475 | B1 | 4/2017 | Schultz |
| 9,656,174 | B1 | 5/2017 | Mclellan |
| 9,669,313 | B2 | 6/2017 | Pieron |
| 9,669,315 | B1 | 6/2017 | Curtis |
| 9,682,314 | B2 | 6/2017 | Kim |
| 9,773,254 | B1 | 9/2017 | Schultz |
| 9,776,089 | B1 | 10/2017 | Curtis |
| 9,782,677 | B1 | 10/2017 | Topkins |
| 9,782,679 | B1 | 10/2017 | Chu |
| 9,789,407 | B1 | 10/2017 | Pieron |
| 9,795,885 | B1 | 10/2017 | Kim |

(56) References Cited

U.S. PATENT DOCUMENTS

| | | | |
|---|---|---|---|
| 9,827,499 B2* | 11/2017 | Pieron | A63F 13/798 |
| 9,873,040 B1* | 1/2018 | Kim | A63F 13/47 |
| 9,901,826 B1 | 2/2018 | Lee | |
| 9,975,050 B1 | 5/2018 | Pieron | |
| 9,978,211 B1 | 5/2018 | Schultz | |
| 10,068,431 B1 | 9/2018 | Howell | |
| 10,307,101 B1 | 6/2019 | Miller | |
| 10,350,501 B2 | 7/2019 | Pieron | |
| 10,357,719 B2 | 7/2019 | Pieron | |
| 10,463,968 B1* | 11/2019 | Patenge | A63F 13/44 |
| 10,565,606 B2 | 2/2020 | Schultz | |
| 10,741,022 B2 | 8/2020 | Schultz | |
| 10,857,469 B2 | 12/2020 | Pieron | |
| 10,929,864 B2 | 2/2021 | Schultz | |
| 10,933,330 B2 | 3/2021 | Pieron | |
| 10,987,590 B2 | 4/2021 | Patenge | |
| 11,058,954 B1* | 7/2021 | Koh | A63F 13/45 |
| 2002/0023039 A1 | 2/2002 | Fritsch | |
| 2002/0059397 A1 | 5/2002 | Feola | |
| 2002/0072412 A1 | 6/2002 | Young | |
| 2002/0094863 A1 | 7/2002 | Klayh | |
| 2002/0095327 A1 | 7/2002 | Zumel | |
| 2002/0115488 A1 | 8/2002 | Berry | |
| 2002/0119824 A1 | 8/2002 | Allen | |
| 2002/0165794 A1 | 11/2002 | Ishihara | |
| 2002/0183105 A1 | 12/2002 | Cannon | |
| 2002/0193162 A1 | 12/2002 | Walker | |
| 2003/0003983 A1 | 1/2003 | Walker | |
| 2003/0008713 A1 | 1/2003 | Ushiro | |
| 2003/0027619 A1 | 2/2003 | Nicastro | |
| 2003/0032476 A1 | 2/2003 | Walker | |
| 2003/0102625 A1 | 6/2003 | Katz | |
| 2003/0109301 A1 | 6/2003 | Chudley | |
| 2003/0157978 A1 | 8/2003 | Englman | |
| 2003/0174178 A1 | 9/2003 | Hodges | |
| 2003/0190960 A1 | 10/2003 | Jokipii | |
| 2003/0216167 A1 | 11/2003 | Gauselmann | |
| 2004/0002387 A1 | 1/2004 | Grady | |
| 2004/0068451 A1 | 4/2004 | Lenk | |
| 2004/0143852 A1 | 7/2004 | Meyers | |
| 2004/0199471 A1 | 10/2004 | Hardjono | |
| 2004/0215524 A1 | 10/2004 | Parkyn | |
| 2004/0224745 A1 | 11/2004 | Bregenzer | |
| 2004/0225387 A1 | 11/2004 | Smith | |
| 2004/0267611 A1 | 12/2004 | Hoerenz | |
| 2005/0096117 A1 | 5/2005 | Katz | |
| 2005/0114223 A1 | 5/2005 | Schneider | |
| 2005/0165686 A1 | 7/2005 | Zack | |
| 2005/0192087 A1 | 9/2005 | Friedman | |
| 2005/0209008 A1 | 9/2005 | Shimizu | |
| 2005/0227751 A1 | 10/2005 | Zanelli | |
| 2005/0255914 A1 | 11/2005 | McHale | |
| 2005/0277474 A1 | 12/2005 | Barry | |
| 2006/0030407 A1 | 2/2006 | Thayer | |
| 2006/0058103 A1 | 3/2006 | Danieli | |
| 2006/0063587 A1 | 3/2006 | Manzo | |
| 2006/0079317 A1 | 4/2006 | Flemming | |
| 2006/0100006 A1 | 5/2006 | Mitchell | |
| 2006/0116196 A1 | 6/2006 | Vancura | |
| 2006/0155597 A1 | 7/2006 | Gleason | |
| 2006/0200370 A1 | 9/2006 | Ratliff | |
| 2006/0205461 A1 | 9/2006 | Larocca | |
| 2006/0217198 A1 | 9/2006 | Johnson | |
| 2006/0287029 A1 | 12/2006 | Yoshinobu | |
| 2006/0287102 A1 | 12/2006 | White | |
| 2007/0021213 A1 | 1/2007 | Foe | |
| 2007/0060297 A1 | 3/2007 | Hein | |
| 2007/0077988 A1 | 4/2007 | Friedman | |
| 2007/0105615 A1 | 5/2007 | Lind | |
| 2007/0111770 A1 | 5/2007 | Van Luchene | |
| 2007/0129139 A1 | 6/2007 | Nguyen | |
| 2007/0129147 A1 | 6/2007 | Gagner | |
| 2007/0155485 A1 | 7/2007 | Cuddy | |
| 2007/0191101 A1 | 8/2007 | Coliz | |
| 2007/0191102 A1 | 8/2007 | Coliz | |
| 2007/0213116 A1 | 9/2007 | Crawford | |
| 2007/0233585 A1 | 10/2007 | Ben Simon | |
| 2007/0281285 A1 | 12/2007 | Jayaweera | |
| 2008/0004093 A1 | 1/2008 | Van Luchene | |
| 2008/0032787 A1 | 2/2008 | Low | |
| 2008/0058092 A1 | 3/2008 | Schwartz | |
| 2008/0076527 A1 | 3/2008 | Low | |
| 2008/0113706 A1 | 5/2008 | OHalloran | |
| 2008/0113815 A1 | 5/2008 | Weingardt | |
| 2008/0124353 A1 | 5/2008 | Brodeur | |
| 2008/0154798 A1 | 6/2008 | Valz | |
| 2008/0171599 A1 | 7/2008 | Salo | |
| 2008/0194318 A1 | 8/2008 | Kralicky | |
| 2008/0200260 A1 | 8/2008 | Deng | |
| 2008/0207306 A1 | 8/2008 | Higbie | |
| 2008/0214295 A1 | 9/2008 | Dabrowski | |
| 2008/0227525 A1 | 9/2008 | Kelly | |
| 2008/0234043 A1 | 9/2008 | McCaskey | |
| 2008/0248867 A1 | 10/2008 | Englman | |
| 2008/0268946 A1 | 10/2008 | Roemer | |
| 2008/0275786 A1 | 11/2008 | Gluck | |
| 2008/0300045 A1 | 12/2008 | Ratcliff | |
| 2008/0318668 A1 | 12/2008 | Ching | |
| 2009/0011812 A1 | 1/2009 | Katz | |
| 2009/0017886 A1 | 1/2009 | McGucken | |
| 2009/0036199 A1 | 2/2009 | Myus | |
| 2009/0048918 A1 | 2/2009 | Dawson | |
| 2009/0061982 A1 | 3/2009 | Brito | |
| 2009/0082099 A1 | 3/2009 | Luciano | |
| 2009/0124353 A1 | 5/2009 | Collette | |
| 2009/0204907 A1 | 8/2009 | Finn | |
| 2009/0208181 A1 | 8/2009 | Cottrell | |
| 2009/0210301 A1 | 8/2009 | Porter | |
| 2009/0234710 A1 | 9/2009 | Belgaied Hassine | |
| 2009/0280905 A1 | 11/2009 | Weisman | |
| 2009/0315893 A1 | 12/2009 | Smith | |
| 2010/0022307 A1 | 1/2010 | Steuer | |
| 2010/0035689 A1 | 2/2010 | Altshuler | |
| 2010/0041472 A1 | 2/2010 | Gagner | |
| 2010/0050088 A1 | 2/2010 | Neustaedter | |
| 2010/0070056 A1 | 3/2010 | Coronel | |
| 2010/0094841 A1 | 4/2010 | Bardwil | |
| 2010/0099471 A1 | 4/2010 | Feeney | |
| 2010/0107214 A1 | 4/2010 | Ganz | |
| 2010/0113162 A1 | 5/2010 | Vemuri | |
| 2010/0120525 A1 | 5/2010 | Baerlocher | |
| 2010/0174593 A1 | 7/2010 | Cao | |
| 2010/0198653 A1 | 8/2010 | Bromenshenkel | |
| 2010/0210356 A1 | 8/2010 | Losica | |
| 2010/0227675 A1 | 9/2010 | Luxton | |
| 2010/0227682 A1 | 9/2010 | Reville | |
| 2010/0228606 A1 | 9/2010 | Walker | |
| 2010/0240444 A1 | 9/2010 | Friedman | |
| 2010/0241491 A1 | 9/2010 | Eglen | |
| 2010/0241492 A1 | 9/2010 | Eglen | |
| 2010/0306015 A1 | 12/2010 | Kingston | |
| 2011/0045898 A1 | 2/2011 | Anderson | |
| 2011/0065511 A1 | 3/2011 | Mahan | |
| 2011/0092271 A1 | 4/2011 | Nguyen | |
| 2011/0092273 A1 | 4/2011 | Cerbini | |
| 2011/0111841 A1 | 5/2011 | Tessmer | |
| 2011/0112662 A1 | 5/2011 | Thompson | |
| 2011/0113353 A1 | 5/2011 | Koh | |
| 2011/0118002 A1 | 5/2011 | Aoki | |
| 2011/0145040 A1 | 6/2011 | Zahn | |
| 2011/0151957 A1 | 6/2011 | Falciglia | |
| 2011/0212756 A1 | 9/2011 | Packard | |
| 2011/0218033 A1 | 9/2011 | Englman | |
| 2011/0227919 A1 | 9/2011 | Bongio | |
| 2011/0250954 A1 | 10/2011 | Braund | |
| 2011/0256936 A1 | 10/2011 | Walker | |
| 2011/0263324 A1 | 10/2011 | Ganetakos | |
| 2011/0275438 A9 | 11/2011 | Hardy | |
| 2011/0281638 A1 | 11/2011 | Bansi | |
| 2011/0281654 A1 | 11/2011 | Kelly | |
| 2011/0282764 A1 | 11/2011 | Borst | |
| 2011/0300923 A1 | 12/2011 | VanLuchene | |
| 2011/0319152 A1 | 12/2011 | Ross | |
| 2011/0319170 A1 | 12/2011 | Shimura | |

(56) References Cited

U.S. PATENT DOCUMENTS

| | | |
|---|---|---|
| 2012/0011002 A1 | 1/2012 | Crowe |
| 2012/0015714 A1 | 1/2012 | Ocko |
| 2012/0015715 A1 | 1/2012 | Luxton |
| 2012/0034961 A1 | 2/2012 | Berman |
| 2012/0040743 A1 | 2/2012 | Auterio |
| 2012/0040761 A1 | 2/2012 | Auterio |
| 2012/0042282 A1 | 2/2012 | Wong |
| 2012/0046111 A1 | 2/2012 | Walker |
| 2012/0047002 A1 | 2/2012 | Patel |
| 2012/0059730 A1 | 3/2012 | Jensen |
| 2012/0083909 A1 | 4/2012 | Carpenter |
| 2012/0101886 A1 | 4/2012 | Subramanian |
| 2012/0108306 A1 | 5/2012 | Munsell |
| 2012/0109785 A1 | 5/2012 | Karlsson |
| 2012/0115593 A1 | 5/2012 | Vann |
| 2012/0122589 A1 | 5/2012 | Kelly |
| 2012/0129590 A1 | 5/2012 | Morrisroe |
| 2012/0130856 A1 | 5/2012 | Petri |
| 2012/0142429 A1 | 6/2012 | Muller |
| 2012/0156668 A1 | 6/2012 | Zelin |
| 2012/0157187 A1 | 6/2012 | Moshal |
| 2012/0157193 A1 | 6/2012 | Arezina |
| 2012/0166380 A1 | 6/2012 | Sridharan |
| 2012/0166449 A1 | 6/2012 | Pitaliya |
| 2012/0178514 A1 | 7/2012 | Schulzke |
| 2012/0178515 A1 | 7/2012 | Adams |
| 2012/0178529 A1 | 7/2012 | Collard |
| 2012/0197874 A1 | 8/2012 | Zatkin |
| 2012/0202570 A1 | 8/2012 | Schwartz |
| 2012/0202589 A1 | 8/2012 | Kelly |
| 2012/0203669 A1 | 8/2012 | Borsch |
| 2012/0215667 A1 | 8/2012 | Ganz |
| 2012/0221430 A1 | 8/2012 | Naghmouchi |
| 2012/0226573 A1 | 9/2012 | Zakas |
| 2012/0231891 A1 | 9/2012 | Watkins |
| 2012/0244945 A1 | 9/2012 | Kolo |
| 2012/0244947 A1 | 9/2012 | Ehrlich |
| 2012/0244950 A1 | 9/2012 | Braun |
| 2012/0245988 A1 | 9/2012 | Pace |
| 2012/0256377 A1 | 10/2012 | Schneider |
| 2012/0265604 A1 | 10/2012 | Corner |
| 2012/0282986 A1 | 11/2012 | Castro |
| 2012/0289315 A1 | 11/2012 | Van Luchene |
| 2012/0289330 A1 | 11/2012 | Leydon |
| 2012/0289346 A1 | 11/2012 | VanLuchene |
| 2012/0295699 A1 | 11/2012 | Reiche |
| 2012/0296716 A1 | 11/2012 | Barbeau |
| 2012/0302329 A1 | 11/2012 | Katz |
| 2012/0302335 A1 | 11/2012 | Gregory-Brown |
| 2012/0309504 A1 | 12/2012 | Isozaki |
| 2012/0311504 A1 | 12/2012 | Van Os |
| 2012/0322545 A1 | 12/2012 | Arnone |
| 2012/0322561 A1 | 12/2012 | Kohlhoff |
| 2012/0329549 A1 | 12/2012 | Johnson |
| 2012/0330785 A1 | 12/2012 | Hamick |
| 2013/0005437 A1 | 1/2013 | Bethke |
| 2013/0005466 A1 | 1/2013 | Mahajan |
| 2013/0005473 A1 | 1/2013 | Bethke |
| 2013/0005480 A1 | 1/2013 | Bethke |
| 2013/0006735 A1 | 1/2013 | Koenigsberg |
| 2013/0006736 A1 | 1/2013 | Bethke |
| 2013/0012304 A1 | 1/2013 | Cartwright |
| 2013/0013094 A1 | 1/2013 | Parks |
| 2013/0013326 A1 | 1/2013 | Miller |
| 2013/0013459 A1 | 1/2013 | Kerr |
| 2013/0029745 A1 | 1/2013 | Kelly |
| 2013/0036064 A1 | 2/2013 | Osvald |
| 2013/0072278 A1 | 3/2013 | Salazar |
| 2013/0079087 A1 | 3/2013 | Brosnan |
| 2013/0090173 A1 | 4/2013 | Kislyi |
| 2013/0090750 A1 | 4/2013 | Herrman |
| 2013/0095914 A1 | 4/2013 | Allen |
| 2013/0123005 A1 | 5/2013 | Allen |
| 2013/0124361 A1 | 5/2013 | Bryson |
| 2013/0151342 A1 | 6/2013 | Citron |
| 2013/0173393 A1 | 7/2013 | Calman |
| 2013/0178259 A1 | 7/2013 | Strause |
| 2013/0184075 A1 | 7/2013 | Kim |
| 2013/0210511 A1 | 8/2013 | Larocca |
| 2013/0217453 A1 | 8/2013 | Briggs |
| 2013/0217489 A1 | 8/2013 | Bronstein Bendayan |
| 2013/0226733 A1 | 8/2013 | Evans |
| 2013/0237299 A1 | 9/2013 | Bancel |
| 2013/0244767 A1 | 9/2013 | Barclay |
| 2013/0260850 A1 | 10/2013 | Carpe |
| 2013/0288757 A1 | 10/2013 | Ridge |
| 2013/0288787 A1 | 10/2013 | Yoshie |
| 2013/0290147 A1 | 10/2013 | Chandra |
| 2013/0303276 A1 | 11/2013 | Weston |
| 2013/0310164 A1 | 11/2013 | Walker |
| 2013/0324259 A1 | 12/2013 | Mccaffrey |
| 2013/0339111 A1 | 12/2013 | Ross |
| 2013/0339228 A1 | 12/2013 | Shuster |
| 2013/0344932 A1 | 12/2013 | Adams |
| 2014/0004884 A1 | 1/2014 | Chang |
| 2014/0011565 A1 | 1/2014 | Elias |
| 2014/0018156 A1 | 1/2014 | Rizzotti |
| 2014/0033262 A1 | 1/2014 | Anders |
| 2014/0038679 A1 | 2/2014 | Snow |
| 2014/0038721 A1 | 2/2014 | Archer |
| 2014/0067526 A1 | 3/2014 | Raju |
| 2014/0067544 A1 | 3/2014 | Klish |
| 2014/0073436 A1 | 3/2014 | Takagi |
| 2014/0087864 A1 | 3/2014 | Togashi |
| 2014/0089048 A1 | 3/2014 | Bruich |
| 2014/0100020 A1 | 4/2014 | Carroll |
| 2014/0106858 A1 | 4/2014 | Constable |
| 2014/0128137 A1 | 5/2014 | Balise |
| 2014/0157314 A1 | 6/2014 | Roberts |
| 2014/0180725 A1 | 6/2014 | Ton-That |
| 2014/0206449 A1 | 7/2014 | Alman |
| 2014/0206452 A1 | 7/2014 | Bambino |
| 2014/0243065 A1 | 8/2014 | Wright |
| 2014/0243072 A1 | 8/2014 | Santini |
| 2014/0274359 A1 | 9/2014 | Helava |
| 2014/0295958 A1 | 10/2014 | Shono |
| 2014/0309026 A1 | 10/2014 | Inukai |
| 2014/0329585 A1 | 11/2014 | Santini |
| 2014/0337259 A1 | 11/2014 | Lamb |
| 2015/0011305 A1 | 1/2015 | Deardorff |
| 2015/0019349 A1 | 1/2015 | Milley |
| 2015/0031440 A1 | 1/2015 | Desanti |
| 2015/0065241 A1 | 3/2015 | Mccarthy |
| 2015/0065256 A1 | 3/2015 | Cudak |
| 2015/0273320 A1 | 10/2015 | Pieron |
| 2015/0306494 A1 | 10/2015 | Pieron |
| 2015/0335995 A1 | 11/2015 | Mclellan |
| 2015/0352436 A1 | 12/2015 | Pieron |
| 2016/0038083 A1 | 2/2016 | Ding |
| 2016/0121219 A1 | 5/2016 | Kim |
| 2016/0236094 A1 | 8/2016 | Pieron |
| 2016/0361654 A1 | 12/2016 | Pieron |
| 2017/0132874 A1 | 5/2017 | Curtis |
| 2017/0132879 A1 | 5/2017 | Alexander |
| 2018/0065042 A1 | 3/2018 | Mclellan |
| 2018/0153463 A1 | 6/2018 | Nissila |
| 2018/0345150 A1 | 12/2018 | Pieron |
| 2018/0353862 A1 | 12/2018 | Pieron |
| 2018/0361256 A1 | 12/2018 | Chu |
| 2019/0134396 A1 | 5/2019 | Toth |
| 2019/0266628 A1 | 8/2019 | Schultz |
| 2019/0279466 A1 | 9/2019 | Schultz |
| 2019/0321734 A1 | 10/2019 | Pieron |
| 2019/0344178 A1 | 11/2019 | Pieron |
| 2020/0047072 A1 | 2/2020 | Patenge |
| 2020/0151751 A1 | 5/2020 | Schultz |
| 2020/0205747 A1 | 7/2020 | Mulligan |
| 2020/0349812 A1 | 11/2020 | Schultz |

(56) References Cited

U.S. PATENT DOCUMENTS

| | | | |
|---|---|---|---|
| 2021/0060441 | A1 | 3/2021 | Pieron |
| 2021/0245058 | A1 | 8/2021 | Patenge |

FOREIGN PATENT DOCUMENTS

| | | |
|---|---|---|
| WO | 2013013281 | 1/2013 |
| WO | 2013059639 | 1/2013 |
| WO | 2015013373 | 1/2015 |
| WO | 2015153010 | 10/2015 |
| WO | 2015168187 | 11/2015 |
| WO | 2015179450 | 11/2015 |
| WO | 2015196105 | 12/2015 |

OTHER PUBLICATIONS

"A Wondrous Drop Event and Double EXP", [dated Aug. 22, 2012], From flyff-wiki. [online], [retrieved on Jan. 12, 2016]. Retrieved from the Internet <URL:http://flyff-wiki.webzen.com/wiki/A_Wondrous_Drop_Event_and_Double_EXP>. 2 pages.

"Behavioural Analytics & Campaigning", http://lotaris.com/behavioural._analytics_and._Campaigning.htm, screenshot access date May 24, 2012 2:21 PM, 1 page.

"Building Structures". War2.warcraft.org. Online. Accessed via the Internet. Accessed Aug. 9, 2014. <URL: http://war2.warcraft.org/strategy/verybasics/building.shtml>, 3 pages.

"Cataclysm Guide: Guild Advancement—Wowhead", http://www.wowhead.com/guide=cataclysm&guilds, printed Dec. 5, 2013, 4 pages.

"Clash of Clans". Wikipedia.org. Online. Accessed via the Internet. Accessed Aug. 9, 2014. <URL: http://en.wikipedia.org/wiki/Clash of Clans>, 3 pages.

"Digital River World Payments and Lotaris Partner to Extend Mobile Application Licensing and Monetization Capabilities to Software Publishers", Business Wire Press Release, http://www.marketwatch.com/story/digital-river-world-payments-and-lotaris . . . , posted San Francisco, Mar. 27, 2012 (Business Wire), 8:30 a.m. EDT, printed May 24, 2012 2:32 PM, 3 pages.

"Digital River World Payments and Lotaris Partner to Extend Mobile Application Licensing and Monetization Capabilities to Software Publishers", Lotaris Press Release, http://www.lotaris.com/digital_river_world_payments_and_lotaris_partne . . . , posted Tuesday, Mar. 27, 2012, screenshop access date May 24, 2012, 2:19 PM, 1 page.

"Flyff", [dated May 25, 2013]. From Wikipedia, The Free Encylopedia. [on line], [retrieved on Jan. 12, 2016]. Retrieved from the Internet<URL:https://en.wikipedia.org/w/index.php?title=Flyff&oldid=556751091 >. 4 pages.

"Gem calculation formulas", forum.supercell.net. Online. Accessed via the Internet. Accessed Aug. 9, 2014. <URL: http://forum.supercell.net/showthread.php/23028-Gem-calculation-formulas>, 3 pages.

"Getting Started" written by BoD, published on Oct. 13, 2011 and printed from URL <http://lotrowiki.com/index.php?title=Getting_Started&oldid=349681 >, 5 pages.

"Guild Housing System—FlyFF Wiki", http://flyff-wiki.gpotato.com/wiki/Guild_Housing_System, printed Dec. 5, 2013, 5 pages.

"How Town Hall to Level 4". Forum.supercell.net. Online. Jan. 31, 2013. Accessed via the Internet. Accessed Feb. 21, 2015. URL:http://forum.supercell.net/showthread.php/15052-How-Town-Hall-to-Level-4, 2 pages.

"I don't have enough resources/builders to upgrade anything in my village, what can I do?" gamesupport.supercell.net. Online. Accessed via the Internet. Accessed Aug. 9, 2014. <URL: https://gamesupport.supercell.net/hc/en-us/articles/421482-I-don-t-have-enough-resources-builders-to-upgrade-anything-in-my-village-what-can-I-do->, Apr. 23, 2014, 9 pages.

"Kabam Community Forums > Kingdoms of Camelot > Kingdoms of Camelot Open Discussion > Open Discussion : Tournament of Might Prizes / Main Discussion thread", printed from http://community.kabam.com/forums/archive/index.php/t-43273.html, Oct. 24, 2011, 23 pages.

"Lotro Store" written by Elinnea, published on Dec. 15, 2011 and printed from URL <http://lotrowiki.com/index.php ?title=LOTRO_Store&oldid=396550>, 23 pages.

"Lotro-Wiki.com" (evidence in regards to "Lord of the Rings Online" MMORPG game), latest Dec. 22, 2011, <http://lotrowiki.com/index.php/Main_Page), http://lotro-wiki.com/index.php?title=LOTRO_Store&oldid=396550, http://lotro-wiki.com/index.php?title=Quest:A_Little_Extra_Never_Hurts_--_Part_1&oldid=399597, Links are to used articles, 28 pages.

"Lotro-Wiki.com" (evidence in regards to "Lord of the Rings Online" MMORPG game), latest Dec. 22, 2011, http://lotro-wiki.com/index.php/Main_Page) (http://lotro-wiki.com/index.php?title=LOTRO_Store&oldid=396550, http://lotro-wiki.com/index.php?title=Quest:A_Little_Extra_Never_Hurts_--_Part_1&oldid=399597, http://lotro-wiki.com/index.php?title=Quest:A_Little_Extra_Never_Hurts_--_Part_2&oldid=399366, http://lotro-wiki.com/index.php?title=Getting_Started&oldid=349681, Links are to used articles, 33 pages.

"Main Page" written by Starbusty, published on Dec. 12, 2011 and printed from URL <http://lotrowiki.com/index.php?title=Main_Page&oldid=394429>, 2 pages.

"Quest: A Little Extra Never Hurts—Part 1" written by Zimoon, published on Dec. 22, 2011 and printed from URL <http://lotro-wiki.com/index.php?title=Quest:A_Little_Extra_Never_Hurts_--_Part_ 1 &oldid=399597>, 3 pages.

"Quest: A Little Extra Never Hurts—Part 2" written by Zimoon, published on Dec. 21, 2011 and printed from URL <http://lotro-wiki.com/index.php?title=Quest:A_Little_Extra_Never_Hurts_--_Part_2&oldid=399366>, 2 pages.

"Rest—WoWWiki—Your guide to the World of Warcraft", printed from http://www.wowwiki.com/Rest, May 19, 2014, 2 pages.

"Scroll of Amplification R", [dated Apr. 26, 2012]. From flyff-wiki. [online], [retrieved on Jan. 12, 2016]. Retrieved from the Internet<URL:http://flyff-wiki.webzen.com/wiki/Scroll_of_Amplification_R>. 3 pages.

"Treasure Chest Game" written by Zelda Wiki, the Zelda encyclopedia; published on or before Oct. 17, 2012; accessible and printed from URL http://web.archive.org/web/20121017085058/http://zeldawiki.org/Treasure_Chest_Game>, 4 pages.

"Warcraft II: Tides of Darkness". Wikipedia.org. Online. Accessed via the Internet. Accessed Aug. 9, 2014. <URL: http://en.wikipedia.org/wiki/Warcraft_II:_Tides_of_Darkness>, 10 pages.

<http://lotro-wiki.com/index.php?title=Ouest:A_Little_Extra_Never_Hurts_--_Part_2&oldid=399366>, <http://lotrowiki.com/index.php ?title=Getting_ Started&oldid=349681 >. Links are to used articles. (7 pgs) Feb. 26, 2014.

City Coins. CityVille Wikia. Online. Accessed via the Internet. Accessed Aug. 9, 2014. <URL: http://cityville.wikia.com/wiki/City_Coins>, 2 pages.

Diablo 2, Blizzard Entertainment, Mar. 23, 2009, manual and online website, http://web.archive.Org/web/20090323171356/http://classic.battle.net/diablo 2exp/items/basics.shtml, 51 pages.

Dreamslayer's Enchanting and Upgrading Guide—With Pictures:D and Explanations, URL: forums.elswordonline.com/Topic5673.aspx [Retrieved Feb. 21, 2013], 8 pages.

Elsword—Wikipedia, the free encyclopedia, URL: en.wikipedia.org/wiki/Elsword [Retrieved Feb. 21, 2013], 6 pages.

Elsword, Dec. 27, 2007, KOG Studios, Guide posted Mar. 17, 2011, http://forums.elswordonline.com/topic5673.aspx, http://en.wikipedia.org/wiki/Elsword, 16 pages.

FriskyMongoose "Happy Island Updates", available Jun. 12, 2012 from https://web.archive.org/web/20120612004417/http://friskymongoose.com/happy-island-updates-new-attractions-decorations-and-limited-edition-item-bundles/, 7 pages.

Gaia "Black Friday Bundle" available on Nov. 23, 2011, from http://www.gaiaonline.com/forum/community-announcements/black-friday-big-bundles-rare-items/t.76127933/, 5 pages.

Gem System—Street Fighter X Tekken, http://www.streetfighter.com/us/sfxtk/features/gem-system, printed Nov. 6, 2012, 6 pages.

(56) References Cited

OTHER PUBLICATIONS

Hamari, Juho, "Game Design as Marketing: How Game Mechanics Create Demand for Virtual Goods", available on vol. 5, Issue 1, 2010, retrieved from Int. Journal of Business Science and Applied Management—http://www.business-and-management.org/library/2010/5_1-14-29-Hamari,Lehdonvirta.pdf, on May 26, 2015, 16 pages.

Katkoff, Michail, "Clash of Clans—the Winning Formula", Sep. 16, 2012, retrieved from Internet on Sep. 30, 2015 from URL <http://www.deconstructoroffun.com/2012/09/clash-of-clans-winning-formula.html>, 13 pages.

MapleStory—Guides—Equipment Upgrading 101: Enhancements, URL: maplestory.nexon.net/guides/game-play/systems/OOFIk; [Retrieved Jun. 24, 2013] 3 pages.

MapleStory—Guides—Equipment Upgrading 101: Potentials, URL: maplestory.nexon.net/guides/game-play/systems/OOFIj/ [Retrieved Jun. 24, 2013], 5 pages.

MapleStory—Guides—Equipment Upgrading 101: Scrolls, URL: maplestory.nexon.net/guides/game-play/systems/OOFFV/#mitigating [Retrieved Jun. 24, 2013], 4 pages.

MapleStory, Internet guide: http://maplestory.nexon.net/guides/game-play/systems/00Flk/, http://maplestory.nexon.net/guides/game-play/systems/00Flk, http://maplestory.nexon.net/guides/game-play/systems/00FFV, Sep. 28, 2012, 12 pages.

MMO Site "Rose Online Launches the Newest in Game Feature"; available Aug. 11, 2011 from https://web.archive.org/web/20110811231226/http://news.mmosite.com/content/2011-06-21/rose_online_launches_the_newest_in_game_feature.1.shtml, 3 pages.

New Feature: Tiered Tournaments and Tournament Updates, printed from http://community.kabam.com/forums/showthread.php?171349-New-Feat on Feb. 11, 2014, 2 pages.

Ozeagle, "What happens if . . . answers about account types" on Lotro forum, Jan. 18, 2011 ,<https://www.lotro.com/forums/showthread.php?377885-What-happens-if-answers-about-the-account-types> (16 pgs).

Path of Exile—Forum—Beta General Discussion—Unique Items Compendium 60/71 URL: web.archive.org/web/20120608004658/http://www.pathofexile.com/forum/view-thread/12056 [Retrieved Jun. 24, 2013], 52 pages.

Path of Exile, Internet posting: http://web.archive.org/web/20120606004658/http://www.pathofexile.com/forum/view-thread/12056, Nov. 16, 2011, 52 pages.

PCT International Search Report and Written Opinion for PCT/US2016/017637 dated Apr. 7, 2016, 12 pages.

Profession—WoWWiki—Your guide to the World of Warcraft, URL: http://www.wowwiki.com/Profession, printed Nov. 6, 2012, 8 pages.

Super Mario Bros. 3 Review, Nintendo for NES, Feb. 1990, pp. 1-4.

Super Mario Bros. 3, NES Gameplay, http://www.youtube.com/watch?v=82TL-Acm4ts, Published on Mar. 14, 2009, 1 page.

Super Mario Bros. 3, StrategyWiki, the video game walkthrough and strategy guide, http://strategywiki.org/wiki/Super_Mario_Bros._3, Oct. 2, 2012, 4 pages.

TFF Challenge—UC Davis, http://tffchallenge.com/team/uc-davis/, printed Jan. 15, 2014, 12 pages.

TFWiki "teamfortress wiki" available Nov. 5, 2011 retrieved from https://web.archive.org/web/20111105044256/http://wiki.teamfortress.com/wiki/Loadout, 4 pages.

The Arreat Summit—Items: Basic Item Information, URL: web.archive.org/web/20090323171356/http://classic.battle.net/diablo2exp/items/basics.shtml [Retrieved Feb. 21, 2013], 3 pages.

UBC, "Theory of Auctions" available on Mar. 24, 2012 from https://web.archive.org/web/20120324204610/http:/montoya.econ.ubc.ca/Econ522/auctions.pdf, slide 5, Para. 1.3, 19 pages.

Wiki "Gaia online", available on Sep. 9, 2011, https://web.archive.org/web/20110927210155/http://en.wikipedia.org/wiki/Gaia_Online, 8 pages.

Wikipedia, Mafia Wars, <http://en.wikipedia.org/wiki/Mafia_Wars>, Jan. 28, 2012, 3 pages.

\* cited by examiner

SYSTEM AND METHOD FOR PROVIDING DYNAMIC AND STATIC CONTEST PRIZE ALLOCATION BASED ON IN-GAME ACHIEVEMENT OF A USER

FIELD

The disclosure relates to providing dynamic and static contest prize allocation based on in-game achievement of a user in an online game.

BACKGROUND

In traditional in-game tournaments, prize determined solely on player ranking in the tournament is known. Tournaments may be used to encourage players to purchase virtual items in pursuit of amassing an in-game metric that determines tournament ranking. Traditionally, tournament prizes for each rank are static, thus a player may win the same prize if they are the top ranked player and cannot improve their prize with a stronger performance in the metric that the tournament measures.

SUMMARY

One aspect of the disclosure relates to providing dynamic and static contest prize allocation based on in-game achievement of a user in an online game in order to encourage players to continue to purchase items to improve their tournament metrics even if they may be unable to improve their tournament rank. For example, calculation of a dynamic prize may comprise for rank x, the player may gain 1 prize unit for every y Glory gained (when Glory may be the measured by the tournament). The y value may increase for lower ranks achieved in the tournament.

A system configured to facilitate providing an interface-based virtual space tournament generation in an online game may include one or more processors configured to execute compute program modules. The program modules may comprise a space module, an objective criteria module, a user ranking module, an award determination module, an award distribution module and/or any other modules.

The space module may be configured to execute an instance of a virtual space. The instance of the virtual space may be implemented to facilitate participation by the users in an online game. The space module may be configured to facilitate interaction of users with the virtual space and/or each other by performing operations in the virtual space in response to commands and/or any other input received from the users.

An objective criteria module may be configured to obtain event criteria for a limited time event and/or other event. The event criteria may facilitate ranking of users of the game by achievement during the event. The objective criteria module may be configured such that the event criteria may include one or more of: a resource unit amassed, troop unit amassed, wealth, score, and/or other parameters.

A user ranking module may be configured to rank users according to their achievement in the game in terms of the event criteria during the event.

An award determination module may be configured to determine awards to be distributed to the users. The awards may include a first award to be distributed to a first user. The first award may have a primary component, a secondary component, and/or other components. The secondary component of the first award may be determined based on absolute progress of the first user with respect to the event criteria during the event time period and/or any other time period. The primary component of the first award may be determined based on the relative ranking of the first user with respect to the other users as determined by the user ranking module and/or any other module.

The award determination module may be configured such that the primary component includes virtual items for use in the game. The virtual items may include a virtual good, a virtual currency, and/or other virtual items. The award determination module may be configured such that the secondary component includes troops and/or any other characters for use in the game. The award determination module may be configured such that the secondary component may be provided when the first user achieves above a minimum level and/or any other level of absolute progress. The award determination module may be configured such that the secondary component varies based on user results above a minimum level and/or any other level of absolute progress. An award distribution module may be configured to distribute the awards to appropriate users.

A rank presentation module may be configured to effectuate presentation to the first user of a motivation message and/or any other message. The motivation message may comprise an indication of the present first user rank according to their achievement and/or any other user metric in the game. The rank presentation module may be further configured to effectuate presentation to the first user of one or more incentives for achieving a relatively high rank in the hierarchy of ranking of users. The rank presentation module may be configured to effectuate presentation to the first user of one or more incentives for achieving an objective with respect to the event criteria defined by an administrator and/or system.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
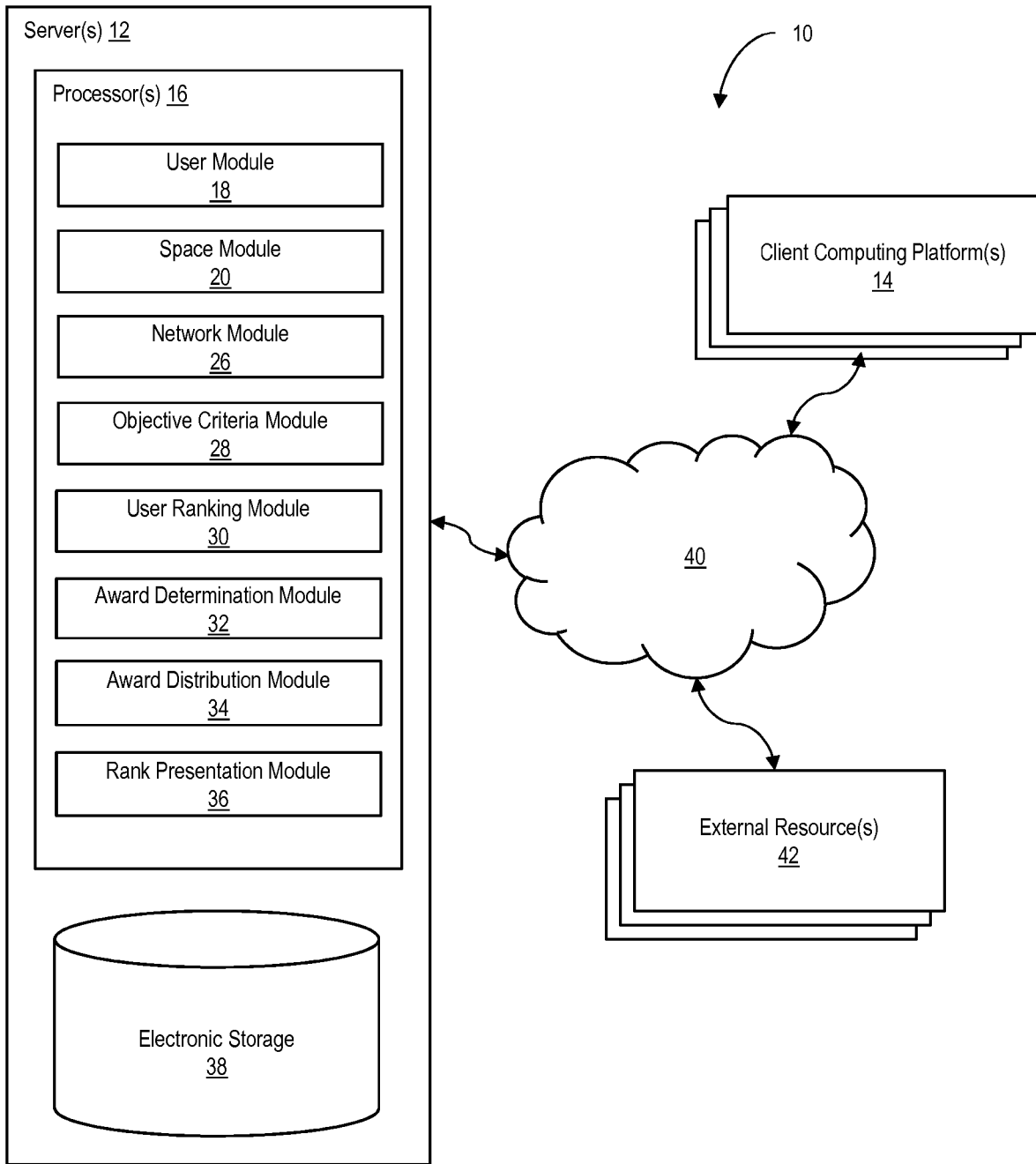
FIG. 1 illustrates an exemplary system configured to provide dynamic and static contest prize allocation based on in-game achievement of a user in an online game, according to an aspect of the invention.

FIG. 1 illustrates a system 10 configured to provide a customized user experience based on a spend frequency of a user in an online game. In some implementations, system 10 may include a game server(s) 12. The game server(s) 12 may host a game space in which an online game takes place. The game server(s) 12 may be configured to communicate with one or more client computing platform(s) 14 according to a client/server architecture. The users may access system 10 and/or the virtual space via client computing platform(s) 14.

The game server(s) 12 may be configured to execute one or more computer program modules. The computer program modules may include one or more of a user module 18, a space module 20, a network module 26, an objective criteria module 28, a user ranking module 30, an award determination module 32, an award distribution module 34, a motivation module 36 and/or any other modules.

The user module 18 may be configured to access and/or manage one or more user profiles and/or user information associated with users of the system 10. The one or more user profiles and/or user information may include information stored by game server(s) 12, one or more of the client computing platform(s) 14, and/or other storage locations. The user profiles may include, for example, information identifying users (e.g., a username or handle, a number, an identifier, and/or other identifying information) within the virtual space, security login information (e.g., a login code or password), virtual space account information, subscription information, virtual currency account information (e.g., related to currency held in credit for a user), relationship information (e.g., information related to relationships between users in the virtual space), virtual space usage information, demographic information associated with users, interaction history among users in the virtual space, information stated by users, purchase information of users, browsing history of users, a client computing platform identification associated with a user, a phone number associated with a user, and/or other information related to users. The user module 18 may be configured to store inventories of virtual items including resources that are available to users in the virtual space. Various matters may be collected in an inventory. These matters may include, but are not limited to, virtual items, virtual resources, character attributes, character skills, and/or virtual currency. A virtual item may be an item that can be used in a virtual world to assist a player's character. Examples of virtual items include, but are not limited to, valuables (money, valuable metals or gems, etc.), weapons, spell components, defense components, and/or armor. A virtual resource may be a resource that can be used in the virtual world to create game attributes. Examples of virtual resources include wood, stone, herbs, water, ores, animals, monsters, bosses, non-player characters (NPCs), building materials, portions, etc. A character attribute may be any quality, trait, feature and/or characteristic a particular character can have. Character attributes may include, but are not be limited to: a character score, a virtual object, the physical appearance of a character, an emblem or mark, a synthetic voice, virtual currency, virtual help points or credits, the ability to join groups of other players at a later time, a score for subsequent matching of later game parameters, a relationship with another character, a genetic profile or makeup, a skill or skill level, and/or a ranking. Character skills may be game attributes inherent in or acquired by a player character during game play such as, but not limited to: the ability to cast (certain) spells, foretell the future, read minds, use (certain) weapons, cook, hunt, find herbs, assemble herbs into portions, mine, assemble objects into other objects, fly, and/or enchant other player characters.

The user may maintain an inventory for the user's character in which virtual awards may be collected. The inventory may be accessed through an interface. As the character progresses through the game it may receive access to higher-level gear. Higher-level gear may be more powerful and/or effective within the game. This may include having parameters (e.g., hit points, attack strength, defense points, speed, and/or other parameters) that enhance the functionality of the gear in the game. The player may be able to review items within the player's inventory and equip the character with an item appropriate to the current game situation. Items may be dragged from the inventory to a preview window. As items are selected, they may appear either on or next to the character. For example, if the character is currently not wearing any armor and/or accessories, armor and accessories such as a cape may be added by accessing the character's inventory. Management of a character's inventory is a common game mechanic, and may lead to many hours of game play. Players may collect, trade, buy, fight over items, and/or perform other actions to add to their inventory. Games in different genres, such as science fiction, may incorporate items specific to that genre. For example, laser guns may be substituted in place of swords as the standard weapon used by characters within a science fiction-type game. The data describing clothing and other equipment or gear may be stored in the character record.

Players within the game may acquire virtual currency. In such games, the virtual currency might be represented by virtual coins, virtual cash, or by a number or value stored by the server for that player's benefit. Such virtual currency represents units of value for use in the online game system, and is analogous to legal currency. Virtual currency can be purchased in one or more actual cash or credit transactions by a player, where the legal currency is transferred using a credit/debit/charge card transaction conveyed over a financial network. A player may earn virtual currency by taking action in the game. For example, a player may be rewarded with one or more units of virtual currency after completing a task, quest, challenge, or mission within the game. For example, a farming game might reward 10 gold coins each time a virtual crop is harvested.

Virtual currency may be used to purchase one or more in-game assets or other benefits. For example, a player may be able to exchange virtual currency for a desired level, access, right, or item in an online game. In some implementations, legal currency can be used to directly purchase an in-game asset or other benefit. The player can select the desired in-game asset or other benefit. Once the necessary selections are made, the player can place the order to purchase the in-game asset or other benefit. This order is received by the game system, which can then process the order. If the order is processed successfully, an appropriate financial account associated with the player can be debited by the amount of virtual currency or legal currency needed to buy the selected in-game asset or other benefit.

Multiple types of virtual currency may be available for purchase from the game system operator. For example, an online game may have virtual gold coins and virtual cash.

The different types of virtual currency may have different exchange rates with respect to legal currency and each other. For example, a player may be able to exchange $1 in legal currency for either 100 virtual gold coins or $2 in virtual cash, but virtual gold coins may not be exchanged for virtual cash. Similarly, where in-game assets and other benefits can be purchased with virtual currency, they may have different exchange rates with respect to the different types of virtual currency. For example, a player may be able to buy a virtual business object for $10 in virtual cash, but may not purchase the virtual business object for virtual gold coins alone. In some embodiments, certain types of virtual currency can be acquired by engaging in various in-game actions while other types of virtual currency can only be acquired by exchanging legal currency. For example, a player may be able to acquire virtual gold coins by selling virtual goods in a business, but can only acquire virtual cash by exchanging legal currency. Virtual cash may also be awarded for leveling up in the game.

The space module 20 may be configured to implement the instance of the virtual space executed by the computer modules to determine state of the virtual space. The state may then be communicated (e.g., via streaming visual data, via object/position data, and/or other state information) from server(s) 12 to client computing platform(s) 14 for presentation to users. The state determined and transmitted to a given client computing platform 14 may correspond to a view for a user character being controlled by a user via the given client computing platform 14. The state determined and transmitted to a given client computing platform 14 may correspond to a location in the virtual space. The view described by the state for the given client computing platform may correspond, for example, to the location from which the view is taken, the location the view depicts, and/or other locations, a zoom ratio, a dimensionality of objects, a point-of-view, and/or view parameters of the view. One or more of the view parameters may be selectable by the user.

The instance of the virtual space may comprise a simulated space that is accessible by users via clients (e.g., client computing platform(s) 14) that present the views of the virtual space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer modules may be synchronous, asynchronous, and/or semi-synchronous.

The above description of the manner in which state of the virtual space is determined by space module 20 is not intended to be limiting. The space module 20 may be configured to express the virtual space in a more limited, or more rich, manner. For example, views determined for the virtual space representing the state of the instance of the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual space are contemplated.

Within the instance(s) of the virtual space executed by space module 20, users may control characters, objects, simulated physical phenomena (e.g., wind, rain, earthquakes, and/or other phenomena), and/or other elements within the virtual space to interact with the virtual space and/or each other. The user characters may include avatars. As used herein, the term "user character" may refer to an object (or group of objects) present in the virtual space that represents an individual user. The user character may be controlled by the user with which it is associated. The user controlled element(s) may move through and interact with the virtual space (e.g., non-user characters in the virtual space, other objects in the virtual space). The user controlled elements controlled by and/or associated with a given user may be created and/or customized by the given user. The user may have an "inventory" of virtual goods and/or currency that the user can use (e.g., by manipulation of a user character or other user controlled element, and/or other items) within the virtual space.

The users may participate in the instance of the virtual space by controlling one or more of the available user controlled elements in the virtual space. Control may be exercised through control inputs and/or commands input by the users through client computing platform(s) 14. The users may interact with each other through communications exchanged within the virtual space. Such communications may include one or more of textual chat, instant messages, private messages, voice communications, and/or other communications. Communications may be received and entered by the users via their respective client computing platform(s) 14. Communications may be routed to and from the appropriate users through server(s) 12 (e.g., through space module 20).

The space module 20 may be configured to execute an instance of a virtual space. The instance of the virtual space may be implemented to facilitate participation by the users in an online game. The space module 20 may be configured to facilitate interaction of users with the virtual space and/or each other by performing operations in the virtual space in response to commands and/or any other input received from the users.

Network module 26 of the game server(s) 12 may be configured to maintain a connection to the one or more client computing platform(s) 14. For example, the network module 26 may maintain one or more communication lines or ports to enable connection and/or exchange of information with a network 40 and/or other computing platforms 14. Information such as state information, game state and game logic may be communicated via network module 26. The network module may be configured to receive information from the client computing platform 14 as well.

An objective criteria module 28 may be configured to obtain event criteria for a limited time event and/or other event. The event criteria may facilitate ranking of users of the game by achievement during the event. The objective criteria module 28 may be configured such that the event criteria may include one or more of: a resource unit amassed, troop unit amassed, wealth, score, and/or other parameters.

The objective criteria module 28 may be configured to determine event criteria for the users indicating the users' progress toward achieving the objective. The users' progress toward achieving the objective may be based upon the one or more event criteria for the user. Different activities, required to be completed to achieve the event criteria, may have different associated complexities and/or time requirements, providing activities having irregularly weighted contributions toward achieving the objectives.

A user ranking module 30 may be configured to rank users according to their achievement in the game in terms of the event criteria during the event. The user ranking module 30 may be configured to determine a hierarchy for the users. The user with the greatest progress toward achieving the objective may appear higher in the hierarchy than a user with less progress toward achieving the objective. The user ranking module 30 may be configured to determine the objective metric values for any number of users, and determine a hierarchy for the any number of users.

The user ranking module 30 may be configured to determine the event criteria for users, where the users may be required to perform different activities in order to achieve an objective. For example, a first user may be required to complete a first activity and a second activity to achieve an objective, as defined by an administrator. A second user may be required to complete a third activity to achieve the objective. Differences in requirements for the users to achieve the objective may be based on one or more user parameters indicating differences in the users.

The user ranking module 30 may be configured to display leaderboards associated with different elements within the game. For example, the game may have one or more administrator defined objectives. Individual ones of the one or more objectives may have associated activities which are required to be completed to achieve the objective. There may be provided a leaderboard for each objective and/or each associated activity displaying the hierarchy of each user with respect to other users in accomplishing the objective and/or completing the activities. Providing leaderboards for each objective and/or activity incentivizes users to keep working toward the particular objective, improving player retention. By providing leaderboards for sub-elements of the game, instead of only providing a single high-score leaderboard, creates increased opportunity for a user to feature on a leaderboard early in the game, increasing the incentive to the user to play, and improving user retention and monetization.

The leaderboards may feature a subset of users from the pool of all users playing the game or working toward achieving the objective. The subset of users may be affiliated or associated with the user to which the leaderboard is presented. The subset of users may be selected based on an indication of one or more user parameters. Such user parameters may include an indication that users commonly interact within the game space, electronic social media associations, geographical location of the users, groups, guilds or alliances that the user belongs to, an indication of the user's real-world affiliations, and/or other user parameters indicating the user has a connection or a similarity with one or more other users.

Providing leaderboards featuring a subset of users having a common attribute and/or affiliation, increases competitiveness in the users, providing an incentive to continue playing, improving user retention and monetization.

An award determination module 32 may be configured to determine awards to be distributed to the users. The awards may include a first award to be distributed to a first user. The first award may have a primary component, a secondary component, and/or other components. The primary component of the first award may be determined based on the relative ranking of the first user with respect to the other users as determined by the user ranking module and/or any other module.

The award determination module 32 may be configured such that the primary component includes virtual items for use in the game. The virtual items may include a virtual good, a virtual currency, and/or other virtual items.

The award determination module 32 may be configured such that the secondary component includes troops and/or any other characters for use in the game. The secondary component of the first award may be determined based on absolute progress of the first user with respect to the event criteria during the event time period and/or any other time period. The award determination module 32 may be configured such that the secondary component may be provided when the first user achieves above a minimum level and/or any other level of absolute progress. The award determination module 32 may be configured such that the secondary component varies based on user results above a minimum level and/or any other level of absolute progress.

A secondary component of the first award may comprise a dynamic prize. For example, a way to calculate the dynamic prizes is based on the absolute progress of the user. For Rank x player will gain 1 prize unit for every y Glory gained (when Glory is the statistic measured by the tournament). The y value increases for lower ranks achieved in the tournament. A tournament leaderboard may display static and dynamic prizes. In some implementations, a tournament leaderboard that shows players' static prizes (remains constant for each rank) as well as their dynamic prize which increases as players improve their statistical performance in the tournament may be displayed. Dynamic and static prizes may be granted to qualifying players at the end of the tournament.

The award determination module 32 may select a statistic that will measure player achievement in a tournament. For each rank, the award determination module 32 may select a dynamic prize and a ratio of what statistical achievement a player may need to earn multiples of the dynamic prizes. The award determination module may calculate the current dynamic prize value for qualifying players based on their current statistical achievement to show the value of individual statistical achievement as well as rank achievement compared to other players.

These awards may be calculated for use in any in-game tournament that measures achievement based on a statistic that can be accumulated comprising one or more: tournaments of might, glory, and/or resource accumulation.

The dynamic prize may be anything that can be provided in multiples: troops, resources, virtual currency, and/or items. New players may be awarded a bonus number of troops based on a percentage of the number of troops they train in the first X number of days. Players may be provided with static prizes alone based on how they performed compared to other players. Events may provide players with tiered prizes based on statistical achievement rather than achievement compared to other players.

An award distribution module 34 may be configured to distribute the awards to appropriate users. Award distribution module 34 may be configured to facilitate distribution of the awards to individual ones of the participating users in accordance with the performance scores of the individual participating users. For example, in one use case, the activity may be collecting a specific type of resource (e.g., diamond, gold, silver, platinum, iron, wheat, etc.) and the performance criteria may include having the most amounts of the specific type of resource collected during the contest period. As such, participating users that have collected more of the specific type of the resource than other participating users during the contest period may be assigned higher performance score than those other participating users. Thus, awards may be automatically distributed to a certain number of the participating users that collect the most amounts of the specific type of resource during the contest period (e.g., at the end of the contest period, at one or more intervals during the contest period, etc.). The awards may include virtual items, virtual currency, buildings, resources, access to other contests, access to regions in the game space, access to activities in the game space, respect, multipliers (e.g., 10× respect), level increase, and/or other awards as described above.

In exemplary implementations, one or more performance criteria to be associated with a contest to be provided in a game space, one or more awards to be distributed in association with the contest, one or more qualifications to participate in the contest, and/or other contest-related user inputs may be received via a user interface. Based on these user inputs, a notification that relates to the contest may be provided in the game space. Contest-related activities that are performed in the game space by the users participating in the contest may be monitored. Performance scores of the participating users may be determined based on the performance criteria and the performed activities. The awards may be automatically distributed to individual ones of the participating users in accordance with the performance scores of the individual participating users. In this way, interface-based game-space contest generation may decrease human-related errors (e.g., by providing more accurate performance scoring of performed contest-related activities, awarding the right participating users, etc.), reduce award distribution delays (e.g., by determining the award winners more quickly, distributing the awards upon such determination, etc.), improve user experience relating to such contests, lower the number of support calls, and/or provide other benefits.

In various implementations, award distribution module 34 may be configured such that at least one of the awards is distributed to at least one of the participating users in response to the performance scores of the at least one participating user satisfying one or more performance thresholds. By way of example, a particular contest in the game space may provide awards to participating users that satisfy a certain performance threshold. In one use case, the particular contest may be configured such that a participating user may be provided with an award associated with the contest if the participating user harvests a specific predetermined amount of resources during the contest period (e.g., harvesting 5000 units of wood, harvesting 2000 units of wheat, etc.). The participating user may, for instance, be provided with the award during or after the contest period in response to determining that the participating user satisfied the specific resource harvesting threshold during the contest period.

In another use case, the participating user may be provided with multiple awards for satisfying multiple performance thresholds. For example, the participating user may be provided with one award after the participating user harvests a first amount of resources (e.g., 5000 units of wood) during the contest period, and a different award after the participating user harvests a second amount of resources (e.g., 12,000 units of wood). In this way, users may be provided with a plurality of incentives to sign up, participate, and/or continue to participate in the game-space contest. The awards may, for instance, be automatically distributed to the participating user in real-time as soon as the participating user completes each set of activities to satisfy the performance thresholds. As such, wait time associated with distribution of the awards may be eliminated or otherwise reduced.

In certain implementations, award distribution module 34 may be configured such that the awards are distributed based on one or more predetermined intervals of the contest. By way of example, a particular contest may last for a period of one week, each day of the contest may represent one time interval of the contest, and award distribution module 34 may be configured to distribute the awards at the end of each day to individual participating users that are determined to have satisfied one or more performance thresholds.

In some implementations, award distribution module 34 may be configured such that a first award of the awards is distributed during a first predetermined interval of the predetermined intervals to a first participating user of the participating users in response to the performance scores of the first participating user satisfying a first performance threshold during the first predetermined interval, and such that a second award of the awards is distributed during a second predetermined interval of the predetermined intervals to the first participating user in response to the performance scores of the first participating user satisfying a second performance threshold during the second predetermined interval.

In one scenario, a particular contest in the game space may last for a period of one week, and each day of the contest may represent one time interval of the contest. The contest may provide awards to participating users for each day that the participating users perform activities that satisfy a performance threshold. For example, a participating user may be provided with 1000 units of wood when the participating user logs into the game space on the first day of the contest (e.g., logging into the game space may be a predefined activity for satisfying a performance threshold). The participating user may be provided with 1500 units of iron when the participating user logs into the game space on the second day of the contest. The participating user may be provided with 2000 units of wheat when the participating user logs into the game space on the third day of the contest, and so on. In this way, among other benefits, contests may enable participating users to develop habits based on the predefined activities (e.g., logging in on a regular basis), encourage a steady stream of activities by participating users, etc.

A rank presentation module 36 may be configured to effectuate presentation to the first user of a motivation message and/or any other message. The motivation message may comprise an indication of the present first user rank according to their achievement and/or any other user metric in the game. The rank presentation module 36 may be further configured to effectuate presentation to the first user of one or more incentives for achieving a relatively high rank in the hierarchy of ranking of users. The rank presentation module 36 may be configured to effectuate presentation to the first user of one or more incentives for achieving an objective with respect to the event criteria defined by an administrator and/or system.

The rank presentation module 36 may be configured to effectuate presentation to the first user of a motivational message, wherein the motivational message comprises an indication of the hierarchy of the objective metric value for the first user. The motivational message may provide an indication that the user is near to achieving the objective, has a relatively high objective metric value compared to other users, and/or provide some other indication of the user's progress toward achieving the objective. The rank presentation module 36 may be further configured to effectuate presentation to the first user of one or more incentives for achieving a relatively high objective metric value in the hierarchy of objective metric values. The rank presentation module 36 may be configured to effectuate presentation to the first user of one or more incentives for achieving the objective defined by an administrator.

Incentives may be available to the users at various stages of accomplishing the objective. Incentives may be available for reaching the top of the objective leaderboard, being an indication of which user is closest to achieving the objective. Similarly, incentives may be available for reaching the top of each of the activity leaderboards or action leaderboards. Incentives may be available for achieving the objective in the shortest period of time, for reaching the top of a leaderboard in the shortest period of time, for achieving the objective or completing an activity with the fewest actions, or for any other measurable stage in a user's progress toward achieving the objective.

Such incentives may include one or more of virtual items, other amounts of virtual currency, access to areas in the game space that were previously not accessible to the first user, quests in the game space that were previously not available to the first user and/or other incentives to incentivize the first user to keep striving to achieve the objective, complete the activity or perform the action.

The game server(s) 12, client computing platform(s) 14, and/or external resource(s) 42 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which game server(s) 12, client computing platform(s) 14, and/or external resource(s) 42 may be operatively linked via some other communication media.

Game server(s) 12 may include Electronic storage 34, one or more processor(s) 16, and/or other components. Game server(s) 12 may include communication lines, or ports to enable the exchange of information with a network 46 and/or other computing platforms 14. Illustration of game server(s) 12 in FIG. 1 is not intended to be limiting. Game server(s) 12 may include a plurality of hardware, software, and/or firmware components operating together to provide the functionality attributed herein to game server(s) 12. For example, game server(s) 12 may be implemented by a cloud of computing platforms operating together as game server(s) 12.

Electronic storage 38 may comprise non-transitory storage media that electronically stores information. The electronic storage media of Electronic storage 34 may include one or both of system storage that is provided integrally (i.e., substantially non-removable) with game server(s) 12 and/or removable storage that is removably connectable to game server(s) 12 via, for example, a port (e.g., a USB port, a firewire port, etc.) or a drive (e.g., a disk drive, etc.). Electronic storage 34 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 38 may include one or more virtual storage resources (e.g., cloud storage, a virtual private network, and/or other virtual storage resources). Electronic storage 38 may store software algorithms, information determined by processor(s) 16, information received from game server(s) 12, information received from client computing platform(s) 14, and/or other information that enables game server(s) 12 to function as described herein.

Processor(s) 16 is configured to provide information processing capabilities in game server(s) 12. As such, processor(s) 16 may include one or more of a digital processor, an analog processor, a digital circuit designed to process information, an analog circuit designed to process information, a state machine, and/or other mechanisms for electronically processing information. Although processor(s) 16 is shown in FIG. 1 as a single entity, this is for illustrative purposes only. In some implementations, processor(s) 16 may include a plurality of processing units. These processing units may be physically located within the same device, or processor(s) 16 may represent processing functionality of a plurality of devices operating in coordination. The processor(s) 16 may be configured to execute modules 18, 20, 26, 28, 30, 32, 34, and 36. Processor(s) 16 may be configured to execute modules 18, 20, 26, 28, 30, 32, 34, and 36 by software; hardware; firmware; some combination of software, hardware, and/or firmware; and/or other mechanisms for configuring processing capabilities on processor (s) 16. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 18, 20, 26, 28, 30, 32, 34, and 36 are illustrated in FIG. 1 as being implemented within a single processing unit, in implementations in which processor includes multiple processing units, one or more of modules 18, 20, 26, 28, 30, 32, 34, and 36 may be implemented remotely from the other modules. The description of the functionality provided by the different modules 18, 20, 26, 28, 30, 32, 34, and 36 described below is for illustrative purposes, and is not intended to be limiting, as any of modules 18, 20, 26, 28, 30, 32, 34, and 36 may provide more or less functionality than is described. For example, one or more of modules 18, 20, 26, 28, 30, 32, 34, and 36 may be eliminated, and some or all of its functionality may be provided by other ones of modules 18, 20, 26, 28, 30, 32, 34, and 36. As another example, processor(s) 16 may be configured to execute one or more additional modules that may perform some or all of the functionality attributed below to one of modules 18, 20, 26, 28, 30, 32, 34, and 36.

A given client computing platform(s) 14 may include one or more processors configured to execute computer program modules. The computer program modules may be configured to enable an expert or user associated with the given client computing platform 14 to interface with system 10, game server(s) 12, and/or external resource(s) 42, and/or provide other functionality attributed herein to client computing platform(s) 14. By way of non-limiting example, the given client computing platform(s) 14 may include one or more of a desktop computer, a laptop computer, a handheld computer, a tablet computing platform, a NetBook, a Smartphone, a gaming console, and/or other computing platforms.

External resource(s) 42 may include sources of information, hosts and/or providers of virtual spaces outside of system 10, external entities participating with system 10, and/or other resources. In some implementations, some or all of the functionality attributed herein to external resource (s) 42 may be provided by resources included in system 10.

Figure 2:
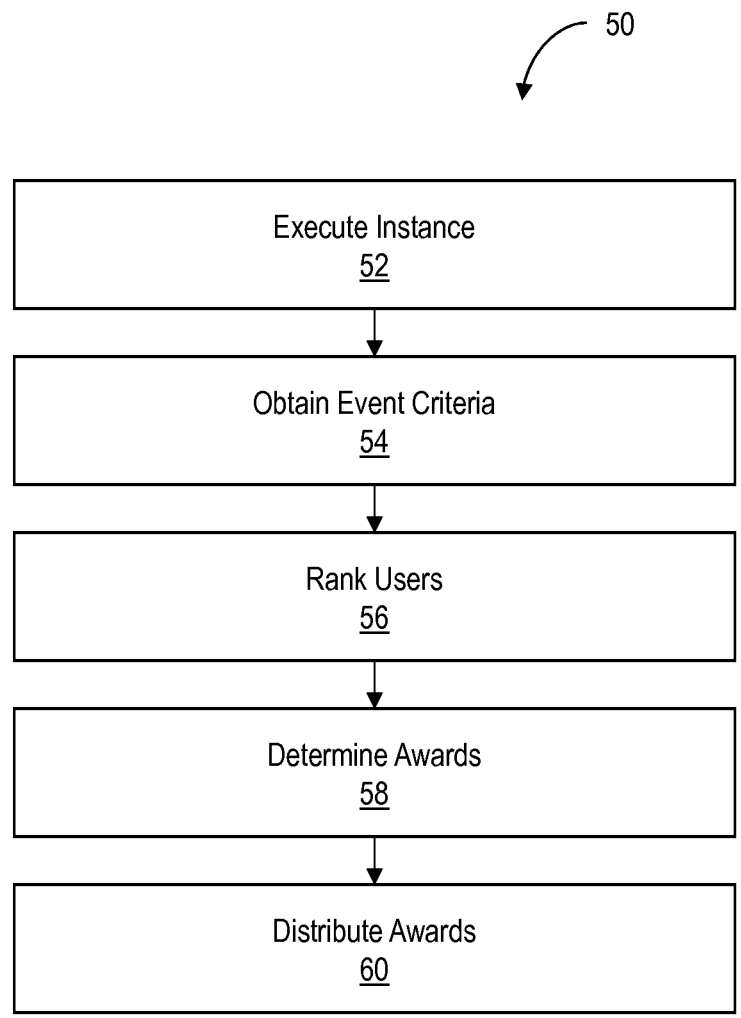
FIG. 2 illustrates an exemplary method of providing dynamic and static contest prize allocation based on in-game achievement of a user in an online game, according to an aspect of the invention.

FIG. 2 illustrates a method 50 of providing dynamic and static contest prize allocation based on in-game achievement of a user in an online game, according to an aspect of the invention. The operations of method 50 presented below are intended to be illustrative. In some embodiments, method 50 may be accomplished with one or more additional operations not described, and/or without one or more of the operations discussed. Additionally, the order in which the operations of method 50 are illustrated in FIG. 2 and described below is not intended to be limiting.

In some embodiments, method 50 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 50 in response to instructions stored electronically on an electronic storage medium. The one or more processing devices may include one or more devices configured through hardware, firmware, and/or software to be specifically designed for execution of one or more of the operations of method 50.

At an operation 52, an instance of a virtual space may be executed. In some implementations, operation 52 may be performed by a space module the same as or similar to space module 20 (shown in FIG. 1 and described above).

At an operation 54, the executed instance of the virtual space may be configured to obtain event criteria by achievement of users of the game is to be ranked as part of a limited time event. In some implementations, operation 54 may be performed by an objective criteria module 28 the same as or similar to objective criteria module 28 (shown in FIG. 1 and described above).

At an operation 56, users may be ranked according to their achievement in the game in terms of the event criteria during an event time period over which the limited time event takes place. In some implementations, operation 56 may be performed by a user ranking module the same as or similar to user ranking module 30 (shown in FIG. 1 and described above).

At an operation 58, awards may be determined to be distributed to the users, the awards including a first award to be distributed to a first user, the first award having a primary component and a secondary component, the secondary component of the first award being determined based on absolute progress of the first user with respect to the event criteria during the event time period, and the primary component of the first award being determined based on the relative ranking of the first user with respect to the other users. Operation 58 may be performed by an award determination module the same as or similar to award determination module 32 (shown in FIG. 1 and described above).

At an operation 60, the award may be distributed to appropriate users. In some implementations, operation 60 may be performed by an award distribution module the same as or similar to award distribution module 34 (shown in FIG. 1 and described above).

Figure 3:
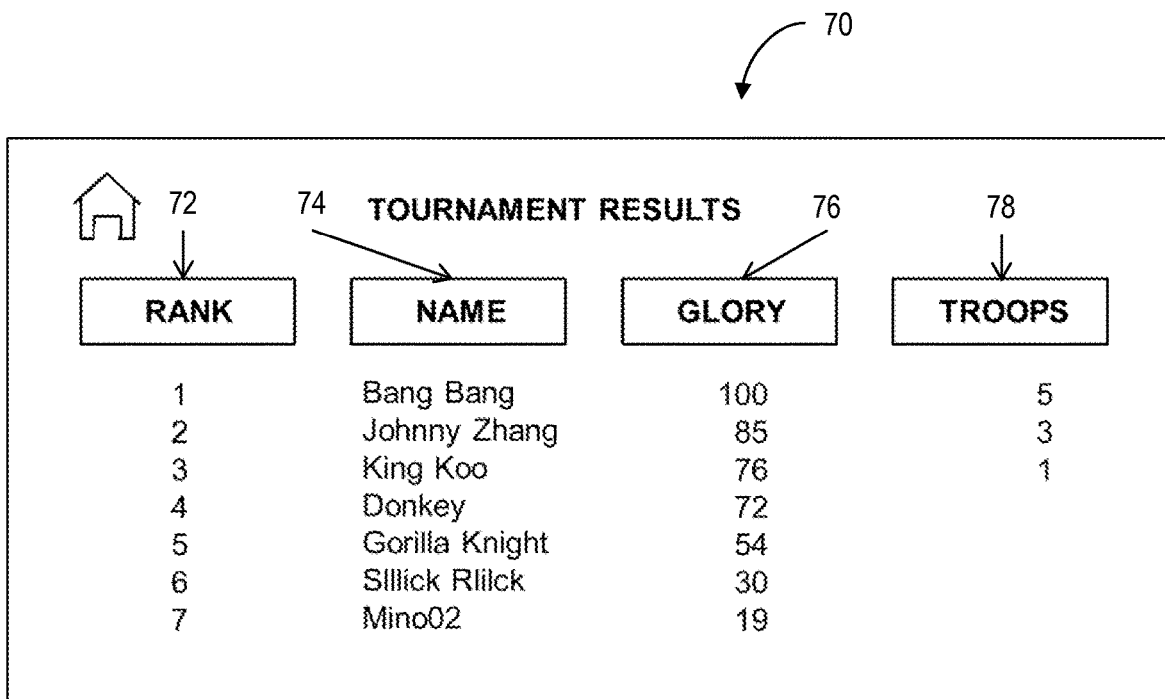
FIG. 3 illustrates an exemplary diagram providing dynamic and static contest prize allocation based on in-game achievement of a user in an online game, according to an aspect of the invention.

FIG. 3 illustrates a leaderboard 70 provided to users based on in-game events, in accordance with one or more implementations. The leaderboard 70 may comprise an objective title, providing the user an indication of which objective the leaderboard 70 pertains. The objective may be defined by an administrator, whereby the individual activities and/or actions required to be completed and/or performed by the user are defined and/or determined. For example, as illustrated in FIG. 2, the objective, associated with leaderboard 70, may be defined as a user, or a user's avatar or character, achieving a certain amount of might, glory, and/or troops.

The leaderboard 70 may include a user group 204. The user group may comprise a group of users selected based upon a common characteristic or parameter. Common characteristics or parameters may include each player working toward achieving the same objective, being associated with one another in the game, such as in a guild or alliance, being associated with one another in electronic social media, having a common regional location in the virtual environment, or in the real-world, belonging to a common organization such as a college, business or interest group, and/or any other commonly held characteristic.

The users presented on the leaderboard may have an associated objective metric value 76, indicating each displayed user's progress toward achieving the objective. In the case illustrated in FIG. 3, the leaderboard 70 may comprise an indication of the amount of glory obtained by each of the displayed users 74 in the user group. The objective metric value 76 and/or 78, may be based upon one or more activity metric values for the users, and/or action metric values for the users. The leaderboard 70 may present the users 74 and/or group of users according to their relative hierarchy, or rank, 72. The group may be a small subset of all users attempting to achieve the objective. Therefore the relative hierarchy, or rank 72 of even the highest user displayed on the leaderboard 70 may be relatively low compared to a group comprising all users. The group of users may be selected based upon an indication that the first user, to whom the leaderboard 70 is presented, has a relatively high within the rank 72. Providing a leaderboard 70 to the first user indicating that the first user has a relatively high rank 72 within the selected group of users incentivizes the first user to continue playing to achieve the objective, improving user retention and monetization.

It would be understood by one of ordinary skill in the art that the leaderboards may not be limited to the embodiment illustrated in FIG. 3. The leaderboard 70 may be associated with an objective, an activity, an action, or a combination thereof.

Figure 4:
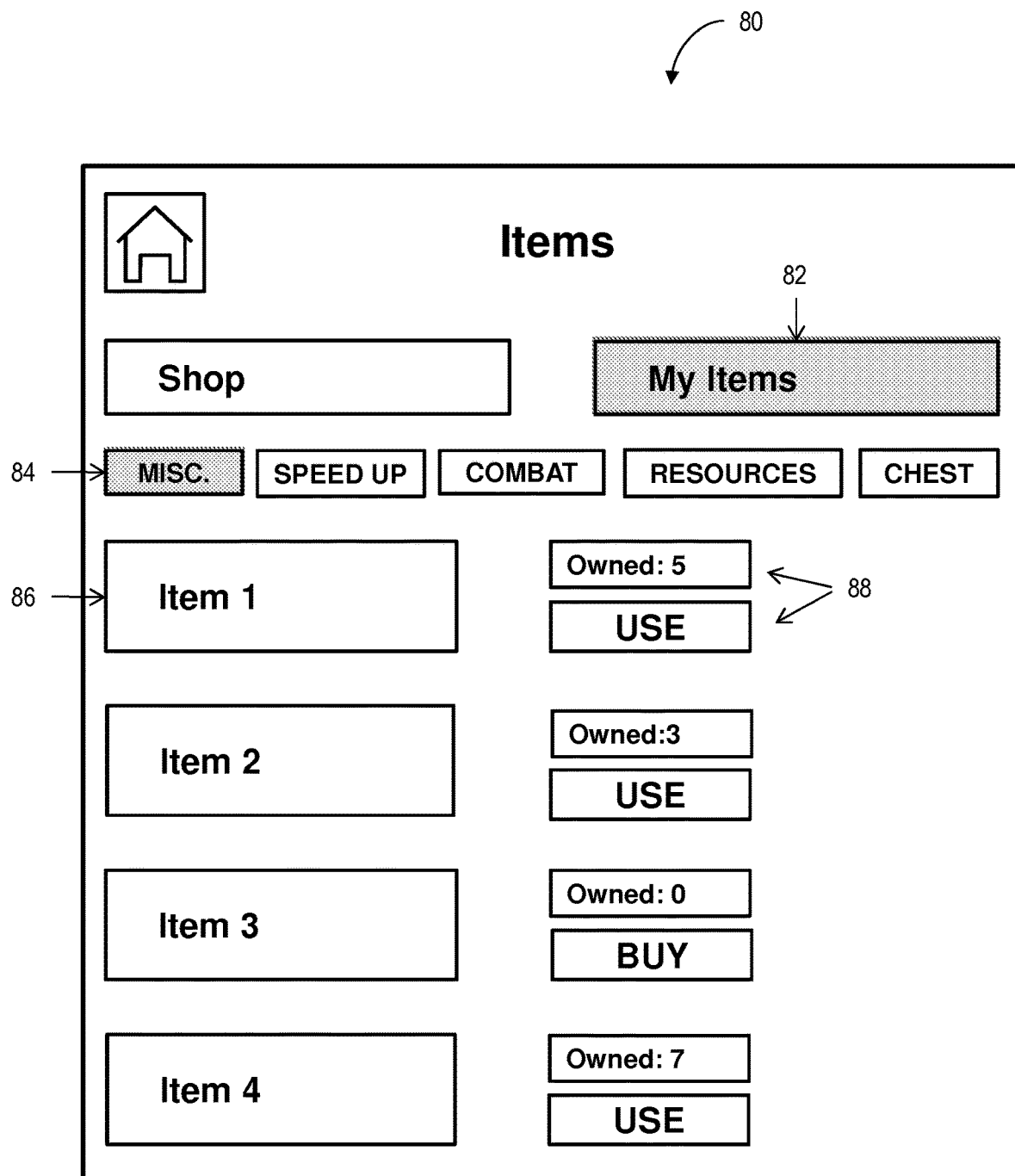
FIG. 4 illustrates an exemplary diagram providing dynamic and static contest prize allocation based on in-game achievement of a user in an online game, according to an aspect of the invention.

FIG. 4 illustrates an exemplary diagram of a user interface 80 which provides in-game pricing relative to player statistics in an online game, according to an aspect of the invention. As shown, user interface 80 enables a user to purchase virtual items and/or store for in-game use. In some implementations, the user may select the my items tab 82, and select from a category 84 of virtual in-game goods which are stored in the user's inventory. In some implementations, the categories may include one or more: miscellaneous, speed up, combat, resources, chest, and/or any other category. Each category contains lists of items 84 for a user to store and/or purchase. The user interface 80 displays the item 86 and the quantity of each item 88 as well as a mechanism to use the items 88 to the user. It would be understood by one of ordinary skill in the art that the leaderboards may not be limited to the embodiment illustrated in FIG. 4. The user interface 80 may be associated with an objective, an activity, an action, or a combination thereof.

Figure 5:
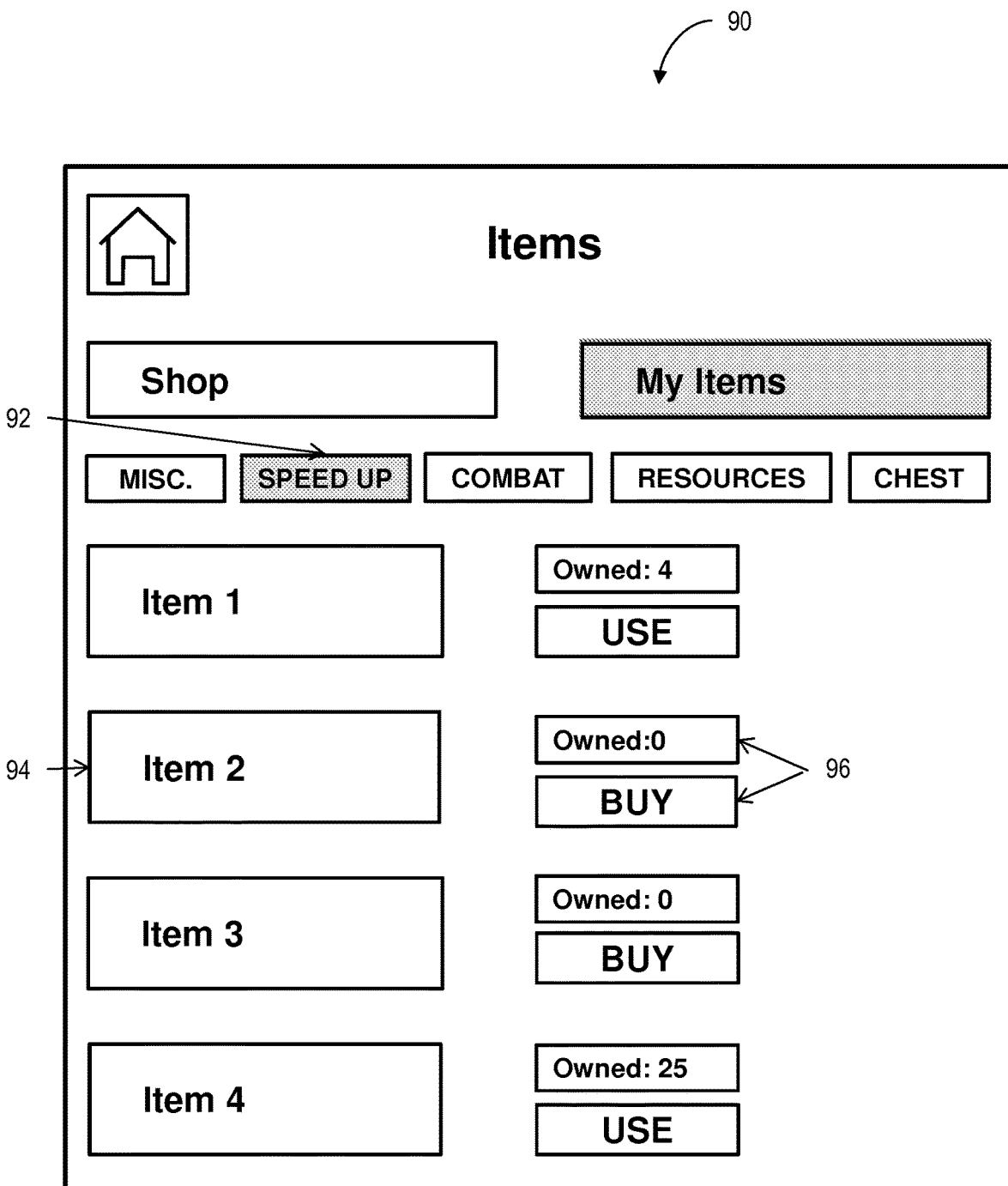
FIG. 5 illustrates an exemplary diagram providing dynamic and static contest prize allocation based on in-game achievement of a user in an online game, according to an aspect of the invention.

FIG. 5 illustrates an exemplary diagram providing dynamic and static contest prize allocation based on in-game achievement of a user in an online game, according to an aspect of the invention. In some implementations, the user may select the my items tab, and select from a category 92 of virtual in-game goods 94 to purchase 96. It would be understood by one of ordinary skill in the art that the leaderboards may not be limited to the embodiment illustrated in FIG. 5. The user interface 90 may be associated with an objective, an activity, an action, or a combination thereof.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system for facilitating an interface-based generation of one or more time-limited events within online games, wherein users participating in the one or more time-limited events are awarded through different components for different types of performances during the one or more time-limited events, the system comprising:
one or more processors configured by machine-readable instructions to:
execute an instance of an online game, wherein the users participate in the online game through one or more client computing platforms associated with the users, and wherein the users interact with other users within the online game;
receive, through an administrator user interface associated with an administrator, event criteria by which one or more types of performances of the users during a limited-time event are to be determined;
evaluate the event criteria for the users during the limited-time event, wherein the limited-time event spans an event time period;
determine, by an award determination module and based on the event criteria as evaluated, awards to be distributed to the users, the awards including a first award to be distributed to a first user, the first award having a first component and a second component, wherein the first component of the first award is determined based on relative performance of the first user during the event time period with respect to other users, and wherein the second component of the first award is determined based on a metric reflecting a first type of performance of the first user during the event time period, wherein the metric reflecting the first type of performance is unrelated to performances of the other users; and
distribute; by an award distribution module, the awards as determined, including the first component and the second component of the first award being distributed to a first user inventory of the first user.

2. The system of claim 1, wherein the one or more processors are configured by machine-readable instructions such that the event criteria are evaluated based on one or more of a resource unit amassed, troop unit amassed, wealth, and/or score.

3. The system of claim 1, wherein the one or more processors are configured by machine-readable instructions such that the first component includes virtual items for use in the online game.

4. The system of claim 1, wherein the one or more processors are configured by machine-readable instructions such that the second component includes troops for use in the online game.

5. The system of claim 1, wherein the one or more processors are configured by machine-readable instructions such that the second component is provided when the first user achieves above a minimum level of absolute progress.

6. The system of claim 1, wherein the one or more processors are configured by machine-readable instructions such that the second component varies based on user results above a minimum level of absolute progress.

7. The system of claim 1, wherein the one or more processors are configured by machine-readable instructions to effectuate presentation to the first user of a motivation message, wherein the motivation message comprises an indication of a present relative performance of the first user with respect to the other users.

8. The system of claim 7, wherein the one or more processors are further configured by machine-readable instructions to effectuate presentation to the first user of one or more incentives for achieving a relatively high performance with respect to the other users.

9. The system of claim 1, wherein the one or more processors are further configured by machine-readable instructions to effectuate presentation to the first user of one or more incentives for achieving an objective with respect to the event criteria defined by the administrator.

10. The system of claim 1, wherein the event criteria require completion of one or more of a task, a quest, a challenge, a mission, and/or an activity within the online game, and wherein determination of one or both of the first component and the second component is based on the completion occurring during the event time period.

11. A method for facilitating an interface-based generation of one or more time-limited events within online games, wherein users participating in the one or more time-limited events are awarded through different components for different types of performances during the one or more time-limited events, the method being implemented on a computer system that includes one or more physical processors, the method comprising:
executing an instance of an online game, wherein the users participate in the online game through one or more client computing platforms associated with the users, and wherein the users interact with other users within the online game;
receiving, through an administrator user interface associated with an administrator, event criteria by which one or more types of performances of the users during a limited-time event are to be determined;
evaluating the event criteria for the users during the limited-time event, wherein the limited-time event spans an event time period;
determining, by an award determination module and based on the event criteria as evaluated, awards to be distributed to the users, the awards including a first award to be distributed to a first user, the first award having a first component and a second component, wherein the first component of the first award is determined based on relative performance of the first user during the event time period with respect to other users, and wherein the second component of the first award is determined based on a metric reflecting a first type of performance of the first user during the event time period, wherein the metric reflecting the first type of performance is unrelated to performances of the other users; and
distributing, by an award distribution module, the awards as determined, including the first component and the second component of the first award being distributed to a first user inventory of the first user.

12. The method of claim 11 wherein the event criteria are evaluated based on one or more of a resource unit amassed, troop unit amassed, wealth, and/or score.

13. The method of claim 11, wherein the first component includes virtual items for use in the online game.

14. The method of claim 11, wherein the second component includes troops for use in the online game.

15. The method of claim 11, wherein the second component is provided when the first user achieves above a minimum level of absolute progress.

16. The method of claim 11, wherein the second component varies based on user results above a minimum level of absolute progress.

17. The method of claim 11, further comprising effectuating presentation to the first user of a motivation message, wherein the motivation message comprises an indication of a present relative performance of the first user with respect to the other users.

18. The method of claim 17, further comprising effectuating presentation to the first user of one or more incentives for achieving a relatively high performance with respect to the other users.

19. The method of claim 11, further comprising effectuating presentation to the first user of one or more incentives for achieving an objective with respect to the event criteria defined by the administrator.

20. The method of claim 11, wherein the event criteria require completion of one or more of a task, a quest, a challenge, a mission, and/or an activity within the online game, and wherein determination of one or both of the first component and the second component is based on the completion occurring during the event time period.

* * * * *